United States Patent
Telamo

(10) Patent No.: US 6,999,293 B2
(45) Date of Patent: Feb. 14, 2006

(54) SAFETY DEVICE FOR A DELTA-CONNECTED THREE-PHASE ELECTRIC APPLIANCE

(76) Inventor: Erkki Telamo, Viitastentie, FIN-01810, Luhtajoki (FI)

(*) Notice: Subject to any disclaimer, the term of this patent is extended or adjusted under 35 U.S.C. 154(b) by 499 days.

(21) Appl. No.: 10/367,728

(22) Filed: Feb. 19, 2003

(65) Prior Publication Data

US 2003/0218846 A1  Nov. 27, 2003

Related U.S. Application Data

(60) Provisional application No. 60/357,622, filed on Feb. 20, 2002.

(51) Int. Cl.
*H02H 3/00* (2006.01)
(52) U.S. Cl. ........................ 361/93.1; 361/94
(58) Field of Classification Search ............... 361/93.1, 361/94
See application file for complete search history.

(56) References Cited

U.S. PATENT DOCUMENTS 2,967,859 A * 1/1961 Osipow et al. .......... 536/29.12
3,266,167 A * 8/1966 Finnegan ..................... 34/543
4,769,556 A   9/1988 Meisner ................. 307/141.8

FOREIGN PATENT DOCUMENTS

| FI | 88848 | 3/1993 |
| FI | 100623 | 1/1998 |
| GB | 2 219 152 | 11/1989 |
| SE | 9102230 | 1/1993 |
| SE | 9402809 | 2/1996 |

* cited by examiner

*Primary Examiner*—Stephen W. Jackson
(74) *Attorney, Agent, or Firm*—Young & Thompson

(57) ABSTRACT

A safety device for use in conjunction with a delta-connected three-phase electric appliance. The electric appliance is supplied in a delta connection so that the loads (100, 101, 102) of the appliance with their respective control switches (100a, 101a, 102a) are connected over the phase legs (L1, L2, L3) of a three-phase supply, whereby the safety device comprises a switch unit, a load current sense unit for monitoring the magnitude of current supplied to the loads and a control unit for controlling the switch unit on the basis of the sensed load current. The control unit incorporates a timer and a switch unit control block, the timer having a nominal operating time of the load, at the lapse of which the switch unit shuts off current supply to the load with the provision that the current supply has not already been shut off by the load control switch proper.

8 Claims, 2 Drawing Sheets

SAFETY DEVICE FOR A DELTA-CONNECTED THREE-PHASE ELECTRIC APPLIANCE

FIELD OF THE INVENTION

The present invention relates to a safety device according to the invention to the preamble of the appended independent claim for an electric appliance supplied in a delta connection. The invention is particularly suited for supervising the operation of household appliances such as electric cooking stoves.

BACKGROUND OF THE INVENTION

In the prior art are known a great number of arrangements for automatic safety shut-off of the current supply to an electric appliance, particularly an electric range or the like. In these embodiments, the shut-off of the current supply is arranged to take place by means of timer-controlled switch, wherein the desired operating time is manually preset on the control switch timer. The switch is tripped at the lapse of the preset operating time, whereby the mains is disconnected from the appliance if the current supply has not been disconnected already prior to this instant from the user control of the electric appliance.

A disadvantage of manually presettable safety timer embodiments is that the desired duration of appliance operation time must be preset into the timer every time the electric appliance is to be switched on. Furthermore, the timer must be manually reset after the use of the appliance is terminated. Resultingly, the use of a safety timer is awkward and the user may not necessarily care to set the timer every time the appliance is operated. Due to these reasons, the benefit of a timer remains minimal.

In the prior art are also known automatic timer embodiments for shutting off current supply to an electric appliance such as an electric range or the like. A disadvantage of these automatic timers is that they provide only a fixed presentable operating time of the electric appliance during which no changes will be taken into account due to loads which vary over a period of time or are unbalanced between the phase legs.

To overcome the disadvantages of the prior-art manual and automatic timer embodiments described above, patent publication FI 100623 B teaches an automatic timer wherein the operating time of an electric appliance such an electric range or the like is determined by magnitude of the load switched on. This kind of automatic timer, however, is handicapped by being usable only in conjunction with appliances connected between one phase and the neutral of the mains or, respectively, in a wye connection to a three-phase power system.

SUMMARY OF THE INVENTION

It is an object of the present invention to provide a novel type of automatic safety device free from the above-described disadvantages and limitations for an appliance supplied in a delta connection from a three-phase power system. To this end, the safety device according to the invention is characterized by what is stated in the independent claim. Preferred embodiments of the invention are disclosed in the dependent claims.

The safety device according to the invention is intended for use in conjunction with an electric appliance such an electric range supplied in a delta connection so that the loads of the appliance with their respective control switches are connected over the phase legs of a three-phase supply, whereby the safety device comprises a switch unit, a load current sense unit for monitoring the magnitude of current supplied to the respective load and a control unit for controlling the switch unit on the basis of the sensed load current, the control unit incorporating a timer and a switch unit control block, the timer having therein preset a nominal operating time of the load at the lapse of which the switch unit under control from the switch unit control block shuts off current supply to the load with the provision that the current supply has not already been shut off by the load control switch proper. According to the invention, the switch unit and the load current sense unit are coupled to operate between a first and a second phase of the current supply and, respectively, the first terminals of a first and a second load of the appliance fed from the current supply, while a virtual neutral is formed by the third phase to which said first and said second load are coupled at their second terminals, and the third load is coupled between the first and the second phase, whereby the load current sense unit senses and monitors only the supply currents to the first and the second load of the electric appliance and, respectively, the switch unit shuts off current supply to monitored load at the lapse of the preset operating time.

A benefit of the present invention is that it provides a cost-efficient and uncomplicated method of implementing a safety device for a delta-connected electric appliance, particularly an electric range. The use of the safety device according to the invention is fully automatic and it needs no separate arming functions. Consequently, the safety device according to the invention is particularly suited for use in families having small children or by elderly people using an electric range. By virtue of the present safety device, the range is prevented from overheating and thus causing damage such as fire.

The safety device according to the invention can be easily and simply retrofitted on delta-connected electric ranges and its use does not imply any changes in the operating manners thereof.

BRIEF DESCRIPTION OF THE DRAWINGS

In the following the invention will be disclosed in detail by making reference to the attached drawings, wherein.

DESCRIPTION OF THE PREFERRED EMBODIMENTS

Figure 1:
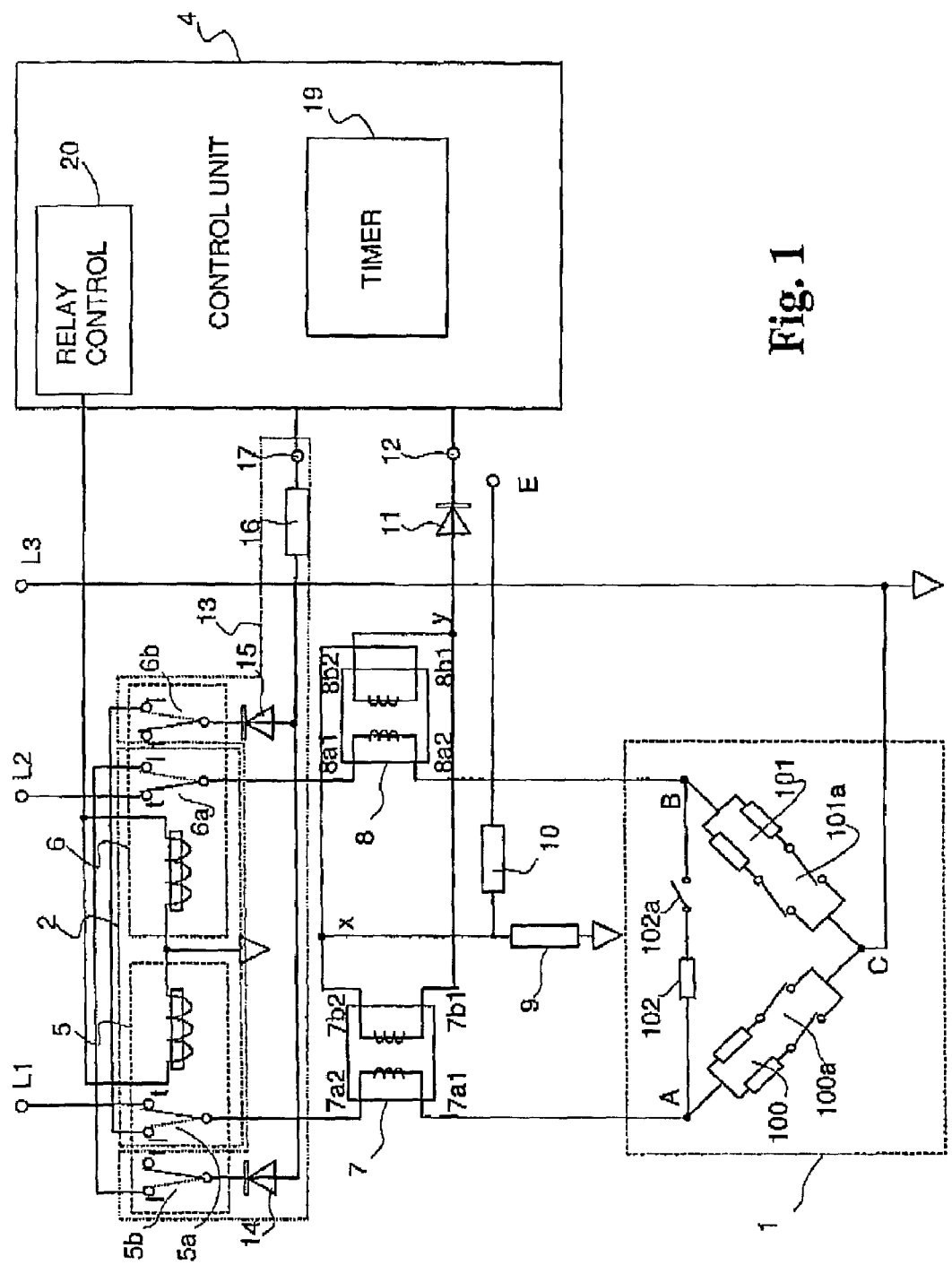
FIG. 1 shows a safety device according to the invention for a delta-connected electric appliance in a partially circuit-diagram and partially block-diagram form.

In the drawing is shown a circuit diagram of a safety device according to the invention intended for use in conjunction with an electric appliance 1 supplied from a three phase power system L1, L2, L3 in a delta connection.

In the exemplary embodiment discussed herein, the electric appliance 1 is an electric range comprising a number of surface elements and an oven. The surface elements are arranged into two electric loads later called a first and a second load 100, 101, both of which advantageously comprise two surface elements operated in parallel, The oven forms a third electric load 103. The electric appliance 1 is supplied in a delta connection so that the first load 100 is coupled between the first phase L1 and the third phase L3 by being connected over range terminals A and C, the second load 101 is coupled between the second phase L2 and the third phase L3 by being connected over range terminals B and C, whereas the third load 102 is coupled between the first phase L1 and the second phase L2 by being connected over range terminals A and B. Each one of the loads 100, 101, 102 is complemented with a control switch 100a, 101a, 102a, respectively, for switching the respective surface element on and adjusting the load level thereof or, respectively, controlling the oven on and off. It must be noted that when the oven forming the third load 102 is on, its temperature is sensed by a thermostat that controls this load on/off so as to keep the oven at a preset temperature.

The function of the present safety device is to sense and monitor the current levels of loads, e.g., a first load 100 and a second load 101, respectively, of an electric appliance 1 connected by means of control switches from two phases, e.g., the first phase L1 and the second phase L2 in the present case, to a third phase L3 acting as a virtual ground, One of the loads, which in the exemplary embodiment is the third load 102 of the appliance and is connected over said two phase legs, above named the first and the second phase, is not sensed or monitored. Hence, the present safety device is particularly well suited for use in conjunction with a delta-connected electric range. The third load 102 of the electric range is the oven of the range and, by being equipped with a thermostat, needs no supervision for possible overheating as is necessary for surface elements of the range forming said first and said second load 100, 101.

The safety device includes a switch unit 2, a load current sense unit 3, an appliance operation monitoring unit 13 and a control unit 4. Electric power to the electric appliance 1, that is, to one or more of its loads 100, 101, 102 is passed from a three-phase power system via a switch unit 2 and a load current sense unit 3 of the safety device.

The switch unit 2 includes two relays 5, 6 or equivalent switch elements such as solid-state switch devices. Either one of the relays 5, 6 or the like devices has at least one toggle switch contact 5a, 6a or equivalent controllable switch element. When the relay 5, 6 is energized by a drive voltage, the toggle switch contacts 5a, 6a are toggled into their energized position t as shown in FIG. 1, whereby the toggle switch contacts 5a, 6a are conducting allowing current to pass through the relay switch elements. This is the normal state of the switch unit 2 corresponding to the stand-by state of the safety device. When the drive voltage is removed from the relay 5, 6, the relay releases, whereby the toggle switch contacts 5a, 6a move into their de-energized position I corresponding to the tripped state of the safety device as will be described later in the text.

The load current sense unit 3 includes two current transformers 7, 8 and a sense circuit 30. Current transformers 7, 8 are identical as to their construction and characteristics. Both of the current transformers 7, 8 comprise a primary and a secondary winding 7a, 7b; 8a, 8b, respectively. In the switch unit 2, the toggle switch contact 5a, 6a of either one of the relays 5, 6 is connected in series with the primary winding 7a, 8a of the respective current transformer 7, 8 of the load current sense unit 3.

The first relay 5, more specifically its first toggle switch contact 5a and the first current transformer 7, more specifically its primary winding 7a, are connected in series so as to form a first safety relay-current transformer circuit, whereas respectively the second relay 6, more specifically its first toggle switch contact 6a, and the second current transformer 8, more specifically its primary winding 8a, are connected in series so as to form a second safety relay-current transformer circuit. The first phase L1 is connected to terminal A of appliance 1 via the first safety relay-current transformer circuit 5a, 7a, whereas respectively the second phase L2 is connected to terminal B of appliance 1 via the second safety relay-current transformer circuit 6a, 8a. As denoted by a small, downward-tipped triangle in the diagram, the third phase L3 serves as the virtual ground of the safety device. The secondary windings 7b, 8b of the current transformers are connected in parallel so that the current $I_1, I_2$ passing via the first and the second load 100, 101 invoke in the secondary winding sense currents $I_{1t}, I_{2t}$ detected by a sense circuit 30, whereas current $I_3$ passing via the third load 102 that is also arranged to pass via the primary windings 7a, 8a of both current transformers invokes in the secondary winding sense currents $I_{3t}$ that are arranged to enter the load current sense circuit in opposite phases thus canceling each other. Resultingly, the load current of the third load 102 is not detected by the load current sense unit 3.

Figure 2:
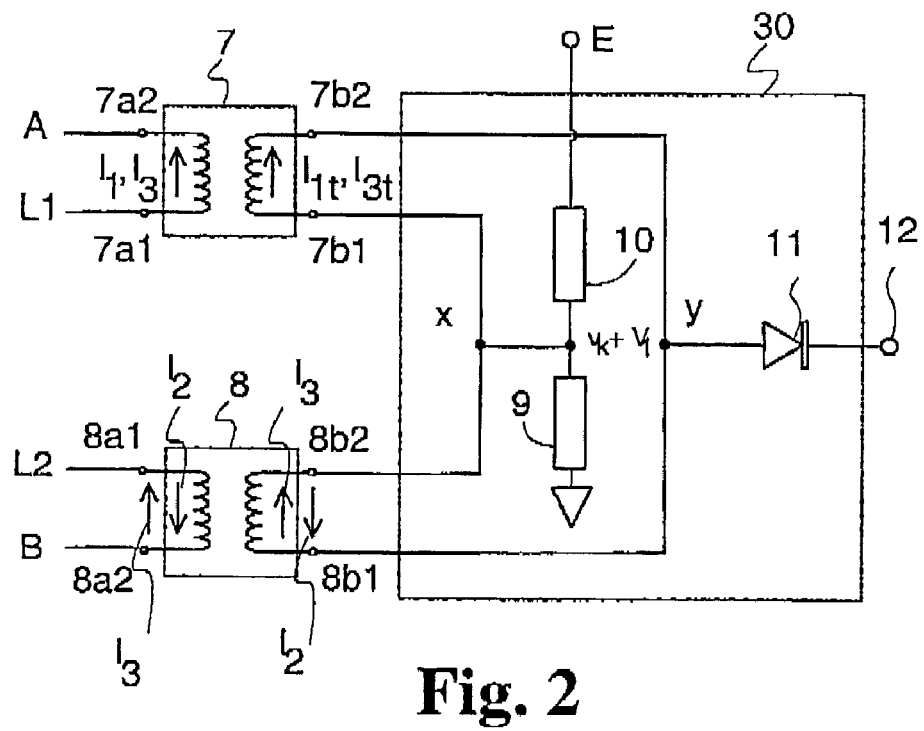
FIG. 2 shows a first embodiment of a load current sense unit.

In a preferred embodiment of the invention, current transformers 7, 8 of the load current sense unit 3 are connected to each other as described below and shown in detail in FIG. 2. The primary windings 7a, 8a of current transformers 7, 8 are is connected to the first and the second phase leg L1 and L2 so that their primary windings are reverse in regard to each other. In the illustrated embodiment, the second terminal 7a2 of the primary winding 7a of the first current transformer 7 is connected to the first phase L1, whereas the first terminal 7a1 is connected to terminal A of the electric appliance 1. Respectively, the first terminal 8a1 of the primary winding 8a of the second current transformer 9 is connected to the second phase L2, whereas the terminal 8a2 is connected to terminal B of the electric appliance 1. Obviously, the order of connection of the primary windings 7a, 8a of transformers 7, 8 may be mirrored from that mentioned above. Using the above-described connection, the direction of currents $I_1, I_2$ in the primary windings 7a, 8a flows in opposite directions when the supply current passes from the respective phase legs L1, L2 via terminals A, B to the first and the second load 100, 101. The secondary windings 7b, 8b of the current transformers are connected reversely in parallel and then coupled to the actual sense circuit 30. Herein, terminals 7b1 and 8b2, as well as terminals 7b2 and 8b1, respectively, must be connected to each other at connection points x, y.

In the illustrated embodiment, the sense circuit 30 of the load current sense unit 3 is implemented so as to incorporate a voltage divider comprising resistors 9, 10. To the first connection point x of the secondary windings 7b, 8b of current transformers 7, 8 is provided a constant bias voltage $V_1$ from a bias voltage source E via the voltage divider comprising the resistors 9, 10. The connection point x is connected to the virtual neutral L3 via the first resistor 9 and to the bias voltage source E via the second resistor 10. Furthermore, the load current sense circuit 30 includes a diode 11 connected to the second connection point y of the secondary windings 7b, 8b. The output signal of the load current sense unit 3 denoted as load current sense point 12 in the diagram is obtained via diode 11 and is further taken to control unit 4. The secondary winding circuits of current transformers 7, 8 provide at the load current sense point 12 a load-current-proportional voltage $v_k$ which is summed to the bias voltage $V_1$ determined by the divider of resistors 9, 10. The purpose of this arrangement is to eliminate the effect of possible electrical disturbance.

When the first load 100 formed by a surface element (either one or both of the surface elements) of the electric appliance 1 is switched on by the control switch 100*a* (that is, by operating either one or both of the respective control switches), the supply current $I_1$ is passed to the first load 100 via the first safety relay-current transformer circuit 5, 7 of the safety device. Respectively, when the second load 101 formed by a surface element (either one or both of the surface elements) of the electric appliance is switched on by the control switch 101*a* (operating either one or both of the respective control switches), the supply current $I_2$ is passed to the second load 101 via the second safety relay-current transformer circuit 6, 8 of the safety device.

With the help of the load current sense unit 3, it is easy to detect current supply and, in particular, the start instant of current supply from a phase L1, L2 of an electric current supply such as the mains to a first and/or second load 100, 101 of the electric appliance 1 when the load is connected to the current supply by its respective control switch 100*a*, 101*a*. In either case, load currents $I_1$, $I_2$ pass via the primary winding circuits of the first and the second current transformer 7, 8 in reverse directions thus driving through resistor 9 current components $I_{1t}$, $I_{2t}$ that run in the same direction and become sensed as a voltage $v_k$ formed over the secondary winding circuits 7*b*, 8*b* and resistor 9 of the load current sense circuit 30. In a similar manner, the load current sense unit 3 detects load current shut-off when the load 100, 101 is disconnected from the current supply in a normal fashion by means of the control switch 100*a*, 101*a*.

When the third load 102 of the electric appliance 1 is connected to the current supply by its respective control switches 102*a*, but no other loads 100, 101 are connected to the current supply, more specifically, to its phase legs L1, L2, the load current $I_3$ passes via the primary winding circuits 7*a*, 8*a* of the first and the second current transformer 7, 8 in the same direction thus driving through resistor 9 two opposed currents $I_{3t}$ that cancel here each other, whereby no sense voltage is detectable at the output of load current sense unit 3 over the parallel-connected secondary winding circuits 7*b*, 8*b* and resistor 9.

Resultingly, a signal indicating the switch-on of the first and the second load 100, 101 to the current supply (and shut-off therefrom) is detected at the load current sense unit 3 wherefrom it is further passed to the control unit 4, whereas the switch-on of the third load 102 to the current supply (and shut-off therefrom) is not detected at the load current sense unit and neither is further passed to the control unit 4.

The operation monitoring unit 13 of appliance 1 is arranged to function as a part of the switch unit 2. In the exemplary embodiment illustrated in the drawing, each one of the relays 5, 6 or equivalent switch elements includes two toggle switch contacts 5*a*, 5*b*; 6*a*, 6*b*, of which the first toggle switch contacts 5*a*, 5*b* act as the make/break contacts proper for disconnecting supply current to loads 100, 101 in the manner described above. The second toggle switch contacts 5*b*, 6*b* of relays 5, 6 serve the monitoring unit 13 that supervises the operation of appliance 1. The second toggle switch contacts 5*b*, 6*b* are arranged to cooperate in a cross-connected manner with the first toggle switch contacts 5*a*, 6*a*. In their de-energized position t, the contacts of the second toggle switch contacts 5*b*, 6*b* are nonfunctional and they are not connected to any supply potential. The second toggle switch contacts 5*b*, 6*b* are cross-connected by their contacts, which are denoted by letter 1 as being closed in their de-energized state, with the respective contacts 1 of the second toggle switch contacts 5*b*, 6*b*. Resultingly, the first toggle switch contact 5*a* of the first relay 5 becomes in its de-energized state 1 connected to the second toggle switch contact 6*a* of the second relay 6 that also is in the de-energized state 1. In a similar fashion, the first toggle switch contact 6*a* of the second relay 6 becomes in its de-energized state 1 connected to the second toggle switch contact 5*b* of the first relay 5 that also is in its de-energized state 1 and, thereby, further to the output of the appliance operation monitoring unit 13, the output being denoted in the diagram as load monitoring point 17.

Additionally, the monitoring unit 13 includes in the illustrated embodiment two monitoring line diodes 14, 15 and a resistor 16. In their de-energized states 1, the second toggle switch contact 6*b* of the second relay 6 and, respectively, the second toggle switch contact 5*b* of the first relay 5 are respectively coupled to the first and the second monitoring line diode 14, 15. The monitoring line diodes 14, 15 are further coupled via resistor 16 to load monitoring point 17 that communicates with control unit 4. When the relays 5, 6 are in their de-energized 1, whereby the safety device is functional, the potential of the virtual neutral L3 acting as a reference point is thus coupled via the first and/or second load 100, 101 of the electric appliance 1, its closed control switch 100*a*, 101*a*, the current transformer primary winding circuit 7*a*, 8*a* and relay 5, 6 to monitoring line diodes 14, 15 and therefrom further to the load current monitoring point 17.

Control unit 4 includes at least one timer 19 combined with a switch unit control block such as a relay control block 20. A signal is issued from load current sense unit 3 to control unit 4 when load point 100, 101 is connected by control switch 100*a*, 101*a* to phase legs L1, L2 and the load current flows via the load current sense unit in the fashion described in the foregoing text. Based on this signal, timer 19 is triggered. At least one predetermined operating cycle is programmed in timer 19. At the lapse of this cycle and still having load point 101, 102 connected to the current supply, a control signal is issued by control unit 4 to the relay control block 20 of the control unit or an equivalent block that controls the switch unit 2 so as to make relays 5, 6 release, whereby relay toggle switch contacts 5*a*, 5*b*; 6*a*, 6*b* assume their de-energized position 1. Resultingly, current flow to load point 100, 101 is shut off. The safety device remains triggered. If load 100, 101 is shut off from the current supply by control switches 101*a*, 102*a* prior to the lapse of the predetermined operating cycle, this is detected by load current sense unit 3, whereby timer 19 is reset and the tripping functions of the safety device are interrupted.

After current flow to load point 100, 102 is interrupted by the safety device and more specifically, by the function of switch unit 2, the operation monitoring unit 13 of the electric appliance 1 continues to monitor the state of control switches 100*a*, 101*a* of the first and the second load point 100, 101 of the electric appliance 1. The operation monitoring unit 13 is capable of sensing the return of control switches 100*a*, 101*a* to their zero positions, that is, the instant when the control switches open. Based on this information, control unit 4 allows the drive voltage of relays 5, 6 of switch unit 2 to be restored, whereby relay toggle switch contacts 5*a*, 6*a* move from their de-energized state 1 to their energized state t thus arming the safety device back to full function.

Figure 3:
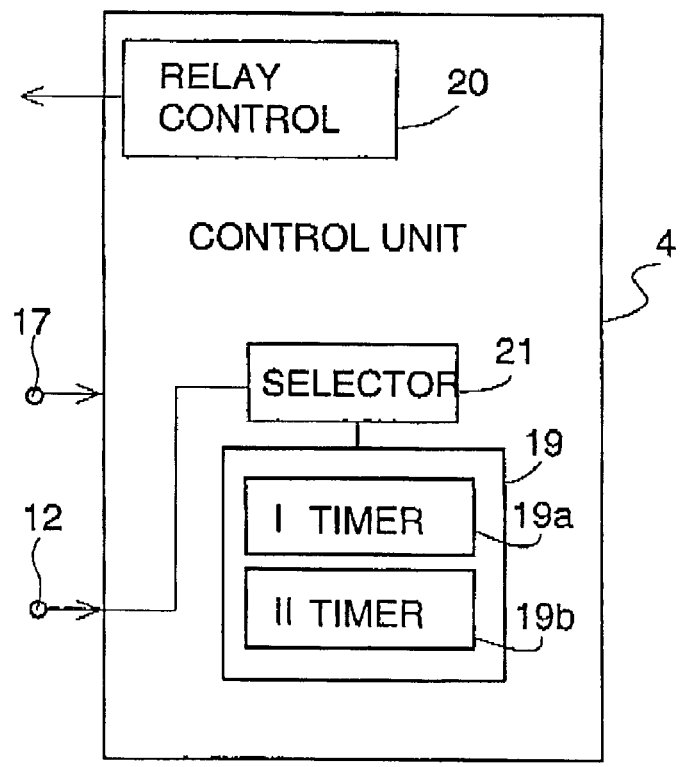
FIG. 3 shows a second embodiment of a load current sense unit.

In an alternative embodiment of the invention, control unit 4 comprises a selector 21 and a timer 19 incorporating at least two timer units 19*a*, 19*b* capable of providing at least two presettable operating cycles with different durations (FIG. 3). With the help of selector 21, it is possible to examine the magnitude of the voltage signal $v_k$ (alternatively, a current signal) which is received from the load current sense unit 3 at the control unit 4 and is proportional to the magnitude of the load 101, 102 being supplied from the power system. At a low load such as a low-power surface element, the device triggers the first timer 19a that may have its first operating cycle programmed to be rather long, e.g., one hour. When the load is greater than a predetermined limit value that may represent, e.g., two surface elements of a given overall load or a single high-power surface element, the device triggers the second timer 19b that has another, relatively short second operating cycle programed therein, e.g., having a duration of 20 min. The number of timers may be made even greater than two, as well as the number of preset operating cycles. Thus, an operating cycle of desired duration can be selected to match the load switched on in the electric appliance.

The safety circuitry according to the invention for a delta-connected electric appliance makes it possible to implement a safety device that can prevent, e.g., inadvertent negligence of leaving an electric range operating unattended consequentially causing damage. The present safety device is capable of automatically at the lapse of a predetermined period of time shutting off current supply to the appliance according to the power level set for the appliance. The safety device can be retrofitted on all modern ranges having 6- or 7-position control switches. The safety device may also be complemented with a visual and/or audible annunciator that informs the use from the power shut-off.

To those skilled in the art, it is obvious that the applications of the present invention are not limited to those described above, but rather, can be modified within the scope and spirit of the appended claims.

What is claimed is:

1. A safety device for use in conjunction with a delta-connected three-phase electric appliance such an electric range supplied in a delta connection so that the loads of the appliance with their respective control switches are connected over the phase legs of a three-phase supply, whereby the safety device comprises a switch unit, a load current sense unit for monitoring the magnitude of current supplied to the said loads and a control unit for controlling the switch unit on the basis of the sensed load current, the control unit incorporating a timer and a switch unit control block, the timer having therein preset a nominal operating time of the load, at the lapse of which the switch unit under control from the switch unit control block shuts off current supply to the load with the provision that the current supply has not already been shut off by the load control switch proper, wherein the switch unit and the load current sense unit are coupled to operate between a first and a second phase of the current supply and, respectively, the first terminals of the first and the second load of the appliance fed from the current supply, while a virtual neutral is formed by the third phase to which said loads are coupled at their second terminals, and the third load is coupled between the first and the second phase, whereby the load current sense unit senses and monitors only the supply currents to the first and the second load of the electric appliance and, respectively, the switch unit shuts off current supply to the monitored load at the lapse of the preset operating time.

2. The safety device of claim 1, wherein the switch unit and the load current sense unit include two switch elements such as relays and two current transformers arranged to respectively cooperate with each other so that a first controllable switch element such as a toggle switch contact is connected in series with the primary winding of the respective current transformer and that said first controllable switch element serves to shut off current supply to the load and that the secondary windings of the current transformers are connected in parallel so that the current passing via the first and the second load is detected by a sense Circuit, whereas the current passing via the third load that is also arranged to pass via the primary windings of the current transformers invokes in the load current sense circuit such current components that enter the load current sense circuit in opposite phases thus canceling each other.

3. The safety device of claim 2, wherein the primary windings of the current transformers are connected to the first and the second phase leg so that their primary windings are reverse in regard to each other, whereas the secondary windings of the current transformers are connected reversely in parallel and then coupled to the actual sense circuit.

4. The safety device of claim 3, wherein the load current sense circuit incorporates a voltage divider by means of which a first connection point of the current transformer secondary windings is connected to a virtual neutral and to a bias voltage source, whereas a second connection point of said secondary windings is arranged to serve said load current sense circuit and, simultaneously, said load sense unit as an output terminal which is coupled to said control unit.

5. The safety device of claim 2, wherein by including a monitoring unit for sensing the status of said appliance via detecting the position of the control switches of the first and the second load of said appliance, the monitoring unit being implemented by means of second controllable switch elements such as toggle switch contacts adapted in the two switch elements of the switch unit.

6. The safety device of claim 5, wherein said second controllable switch elements incorporated in the appliance operation monitoring unit are arranged to cooperate in a cross-connected manner with the first controllable switch elements, whereby, with the provision that the safety circuit is functional and the first controllable switch elements are in a position ready to shut off current supply to the monitored load(s), the load of phase leg serving as a virtual neutral is connected via the first and the second load and the first controllable switch elements to the second controllable switch elements and therefrom further to the output terminal of the monitoring unit which is connected to the control unit.

7. The safety device of claim 6, wherein the monitoring unit includes two monitoring line diodes and a resistor, whereby the diodes are further coupled to the second controllable switch elements and to the resistor whose other end serves as the output terminal of the appliance operation monitoring unit.

8. The safety device of claim 1, wherein the control unit comprises a selector and a timer capable of providing at least two presettable operating cycles with different durations, whereby the selector is arranged to first examine a signal, which is received from the load current sense unit at the control unit and is proportional to the magnitude of the load current, and then to select for the safety device an operating cycle of a duration to match the load being supplied from the power system.

* * * * *